UNITED STATES PATENT OFFICE.

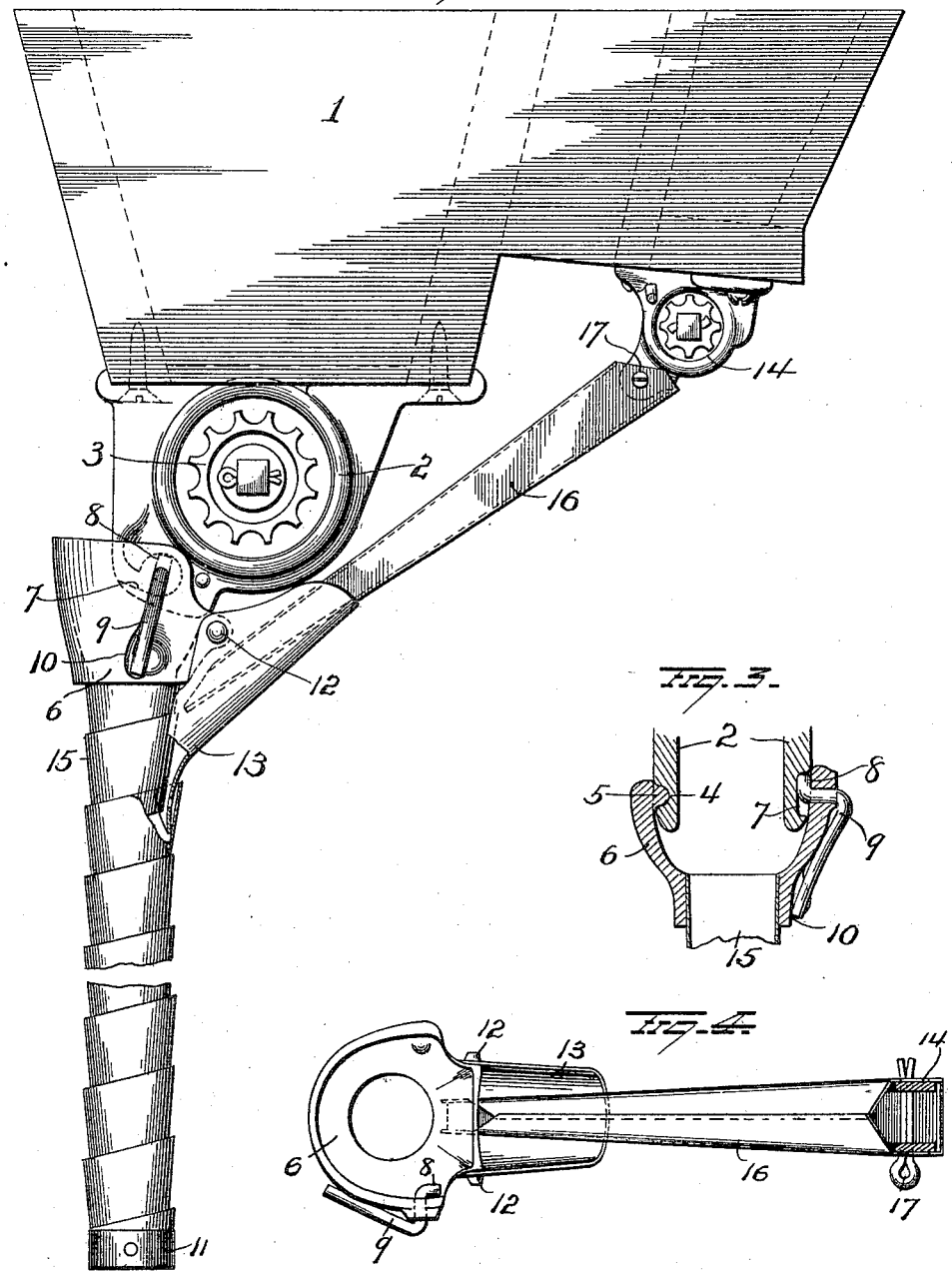

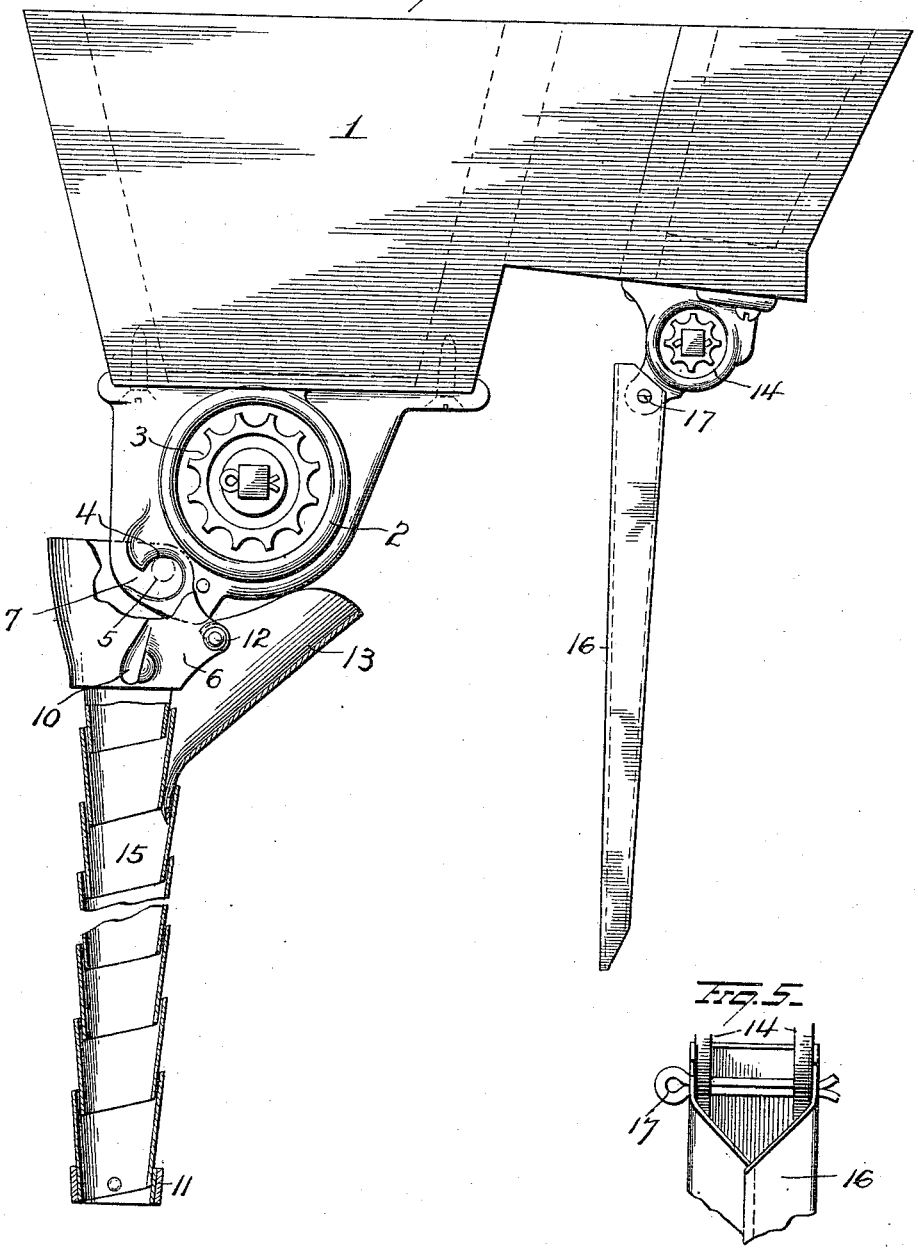

WILLARD A. VAN BRUNT, OF HORICON, WISCONSIN, ASSIGNOR TO THE VAN BRUNT MFG. CO., OF HORICON, WISCONSIN.

GRASS-SEEDING ATTACHMENT FOR GRAIN-DRILLS.

964,715.     Specification of Letters Patent.     Patented July 19, 1910.

Application filed October 15, 1909. Serial No. 522,879.

*To all whom it may concern:*

Be it known that I, WILLARD A. VAN BRUNT, of Horicon, in the county of Dodge and State of Wisconsin, have invented certain new and useful Improvements in Grass-Seeding Attachments for Grain-Drills; and I do hereby declare the following to be a full, clear, and exact description of the invention, such as will enable others skilled in the art to which it appertains to make and use the same.

My invention relates to an improvement in grass seeding attachments for grain drills, the object of the invention being to provide means whereby the grass seed can be discharged into the grain tubes, the conveying means intermediate the grass seeder and the grain tubes being detachable, thus permitting the grass seed to be sown broadcast if desired.

A further object is to provide means for detachably connecting the flexible grain tubes to the seed cup.

With these and other ends in view my invention consists in the parts and combinations of parts as will be more fully described and pointed out in the claims.

In the accompanying drawings, Figure 1 is a view in side elevation of the grain and grass seed hoppers showing the feed attachment of the latter connected to the grain tubes. Fig. 2 is a similar view showing them disconnected. Fig. 3 is a view in vertical section through the force feed seed cup and grain tube of Fig. 1 to the rear of locking lever 9 and looking toward the front, and showing the manner of securing the grain receivers to the flexible tube, and Figs. 4 and 5 are views in detail showing the manner of detachably connecting the grain tube to the seed cup.

1 represents the grain hopper provided with a series of cups 2 with a force feed seeding attachment 3 for each cup, the seeding attachments being of any well known approved form, that shown however being substantially identical with the construction disclosed in my Patent No. 695,509, granted March 18, 1902. The seed cup 2 is provided at one side adjacent to its discharge outlet with a recessed seat 4 adapted to receive a lug 5 cast integral with the grain receiver 6 on the inner face of the latter. The opposite side of the grain cup is also provided with a recessed seat 7 open at its rear side and adapted to receive the bent end 8 of the spring locking lever 9. This locking lever is pivotally mounted in an opening in the upper end of the grain receiver 6 and when turned to approximately horizontal position its bent end 8 easily enters the restricted opening to the recess 7 and by now turning the spring locking lever 9 down the bent end 8 is turned at an angle to the entrance opening to the recess 7 and thus locks the receiver 6 in its proper position but free to swing. The spring locking lever 9 is held in its locked position by springing its free end into the recess 10 in the side of the grain receiver 6. The grain tube 15 is made of a steel ribbon wound spirally, the upper end of the spiral being secured to the receiver 6 and the lower end reinforced by the metal ferrule 11 riveted to the lower end of the spiral tube. The grain receiver 6 is provided adjacent to its rear edge with the integral lugs 12 on which the trough 13 is mounted. This trough is provided with an enlarged upper end and is provided with a reduced lower end, which latter is concaved and is entered between the coils of the spiral tube and discharges the grass seed into the tube below the plane of the receiver 6. This trough 13 is preferably made of sheet metal with holes in its upper side edges to receive the lugs 12 on the grain receiver 6 and in assembling the parts the lower discharge end of the trough is first entered between two coils of the spiral tube, after which the sides are sprung over the lugs 12 which locks the trough permanently in position.

14 is a seed cup secured to the underside of a hopper located in rear of the hopper 1. There is a seed cup 14 for each of the seed cups 2 and means are provided that will be hereinafter described for coupling up the cups 14 with the tubes 15. Each seed cup 14 contains a force feed seeding device of any approved form adapted to feed grass seed.

Leading from each seed cup 14 to its trough 13 is the detachable spout 16. This spout rests loosely at its lower end within trough 13 and is detachably connected at its upper end to the cup 14 by the pin 17. With this arrangement it will be seen that grass seed fed from cups 14 by the force feed seeding attachments will be discharged from the cups 14 into the spout 16 and from the latter into troughs 13 and from thence into the tubes. The grass seed can be sown independently of the grain or with the grain as desired. When it is desired to sow the grass seed broadcast instead of in drills, as above explained, the spouts 16 may be removed by simply withdrawing the pins 17 connecting them to the cups 14, but I prefer after disconnecting them from the troughs to simply turn them and again connect them to the cups 14 so that they may hang vertically and discharge the grain broadcast.

With this improved attachment no change whatever is necessary in the force feed seeding devices or in the grain receivers 6, hence by the addition of the troughs 13 and spouts 16 I can convert a broadcast grass seeder into a drill and by simply removing the spouts can convert the drill into a broadcast seeder.

It is evident that changes in the construction and relative arrangement of the several parts might be made without avoiding my invention and hence I would have it understood that I do not restrict myself to the particular construction and arrangement of parts shown and described, but,—

Having fully described my invention what I claim as new and desire to secure by Letters-Patent, is,—

1. In a grain drill, the combination with a grain seeder and a grain tube connected therewith and adapted to receive the discharge of grain therefrom, of a removable trough detachably secured near its upper end to the tube and discharging into the latter at a point below the top thereof, a grass seeder and a spout connected to the grass seeder and resting on and discharging into the removable trough carried by the grain tube.

2. The combination with a force feed grain seeder, a grain tube made of spirally wound metal ribbon depending from the cup of said grain seeder and a trough discharging into the tube between two coils of the latter, of a grass seeder located in rear of the grain seeder, and means for conveying the grass seed to the trough carried by the tube.

3. The combination with a force feed grain seeder, a grain tube made of spirally wound ribbon depending from the cup of said grain seeder, and a trough discharging into the tube between two coils of the latter, of a grass seeder, and means for conveying the grass seed to the trough carried by the tube.

4. The combination with a force feed seeding machine, the cup of which is provided with a closed recess on one side and an open recess on the other, of a grain tube the receiving end of which is provided with a fixed lug adapted to rest within the closed recess, and a spring locking lever journaled in said tube near the receiving end of the latter journaled in the receiving end of the tube and adapted to enter the open recess and be locked therein by turning it.

5. The combination with a force feed seeding device, the cup of which is provided with a closed recess on one side and an open recess on the other side, of a tube the receiving end of which is provided with a fixed lug adapted to enter the closed recess and with a bent lever, the bent end of which is adapted when in one position to enter the other recess and be locked therein by turning it to its normal position.

6. The combination with a receiver, of a grain tube made of spirally wound metal ribbon attached to said receiver at its upper end and a trough, the lower end of which is inserted between two of the coils of the tube to receive and conduct grass seed to the interior of said tube.

In testimony whereof, I have signed this specification in the presence of two subscribing witnesses.

WILLARD A. VAN BRUNT.

Witnesses:
  F. H. CLAUSEN,
  H. MARSH.